US010657253B2

(12) United States Patent
Lie et al.

(10) Patent No.: US 10,657,253 B2
(45) Date of Patent: May 19, 2020

(54) SYSTEM AND METHOD FOR DETERMINING CORRESPONDENCE AND ACCOUNTABILITY BETWEEN BINARY CODE AND SOURCE CODE

(71) Applicant: THE GOVERNING COUNCIL OF THE UNIVERSITY OF TORONTO, Toronto (CA)

(72) Inventors: David Lie, Toronto (CA); Dhaval Miyani, Scarborough (CA); Janahan Skandaraniyam, Markham (CA); Daniel Thanos, Burlington (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 16/302,532

(22) PCT Filed: May 18, 2017

(86) PCT No.: PCT/CA2017/050599
§ 371 (c)(1),
(2) Date: Nov. 16, 2018

(87) PCT Pub. No.: WO2017/197519
PCT Pub. Date: Nov. 23, 2017

(65) Prior Publication Data
US 2019/0220596 A1    Jul. 18, 2019

Related U.S. Application Data

(60) Provisional application No. 62/338,423, filed on May 18, 2016.

(51) Int. Cl.
*G06F 21/56* (2013.01)
*G06F 21/57* (2013.01)
(Continued)

(52) U.S. Cl.
CPC ........ *G06F 21/563* (2013.01); *G06F 16/9024* (2019.01); *G06F 21/56* (2013.01); *G06F 21/57* (2013.01); *G06K 9/6267* (2013.01)

(58) Field of Classification Search
CPC .............................. G06F 21/563; G06F 21/56
(Continued)

(56) References Cited

U.S. PATENT DOCUMENTS 8,296,849 B2 * 10/2012 Barron .................. G06F 21/125
365/15
2018/0081826 A1 * 3/2018 Gounares .................. G06F 8/41
(Continued)

OTHER PUBLICATIONS

WIPO, International Search Report and Written Opinion for International Application No. PCT/CA2017/050599 dated Jul. 19, 2017.
(Continued)

*Primary Examiner* — Teshome Hailu
(74) *Attorney, Agent, or Firm* — Norton Rose Fulbright Canada LLP

(57) ABSTRACT

A first set of code, for example source code, and a second code, for example binary code, are compared to find corresponding functions. A comparison of features can be used to find correspondences of functions. The comparison of functions can be iterated and can be refined and can be further used to carry out a further, stricter comparison of functions found to correspond to reduce the chance of falsely finding a function in the second code to be accountable in the first code.

20 Claims, 10 Drawing Sheets

(51) Int. Cl.
*G06F 16/901* (2019.01)
*G06K 9/62* (2006.01)

(58) Field of Classification Search
USPC .......................................................... 726/24
See application file for complete search history.

(56) References Cited

U.S. PATENT DOCUMENTS

| | | |
|---|---|---|
| 2018/0285101 A1* | 10/2018 | Yahav ....................... G06F 8/53 |
| 2018/0285172 A1* | 10/2018 | Turner ..................... G06F 9/546 |
| 2019/0147168 A1* | 5/2019 | Kim ....................... G06F 21/577 |
| | | 726/25 |

OTHER PUBLICATIONS

Eschweiler et at.: "DiscovRE: Efficient Cross-Architecture Identification of Bugs in Binary Code"; NDSS '16, Feb. 21-24, 2016, San Diego, CA, USA. Copyright 2016 Internet Society, ISBN 1-891562-41-X, http://dx.doi.org/10.14722/ndss.2016.23185.

Wysopal et al.: "Static Detection of Application Backdoors"; Datenschutz and Datensicherheit—DuD. Mar. 2010, vol. 34, Issue 3, pp. 149-155.

Ming et al.: "MalwareHunt: Semantics-Based Malware Diffing Speedup by Normalized Basic Block Memoization"; Journal of Computer Virology and Hacking Techniques pp. 1-12, First online: May 17, 2016.

Bourquin et al.: "BinSlayer: accurate comparison of binary executables"; Proceeding PPREW '13 Proceedings of the 2nd ACM SIGPLAN Program Protection and Reverse Engineering Workshop, Article No. 4, Rome, Italy—Jan. 26-26, 2013. ACM New York, NY, USA ©2013. ISBN: 978-1-4503-1857-0, doi>10.1145/2430553.2430557.

* cited by examiner

```
; void __cdecl start(char *name, int level)
                public start
start           proc near               ; CODE XREF: main+65↓p level           = dword ptr -0Ch
name            = qword ptr -8 push    rbp
                mov     rbp, rsp
                sub     rsp, 10h
                mov     [rbp+name], rdi
                mov     [rbp+level], esi
                mov     rax, [rbp+name]
Backdoor        mov     esi, offset s2  ; "LegendaryHack"
Injected        mov     rdi, rax        ; s1
                call    _strcmp
                test    eax, eax
                jnz     short locret_4006CD
                cmp     [rbp+level], 4
                jg      short loc_4006BC
                mov     edx, [rbp+level]
                mov     rax, [rbp+name]
                mov     esi, edx        ; level
                mov     rdi, rax        ; name
                call    beginner
                jmp     short locret_4006CD
;------------------------------------------------------------ loc_4006BC:                             ; CODE XREF: start+28↑j
                mov     edx, [rbp+level]
                mov     rax, [rbp+name]
                mov     esi, edx        ; level
                mov     rdi, rax        ; name
                call    advance locret_4006CD:                          ; CODE XREF: start+22↑j
```

Fig. 6

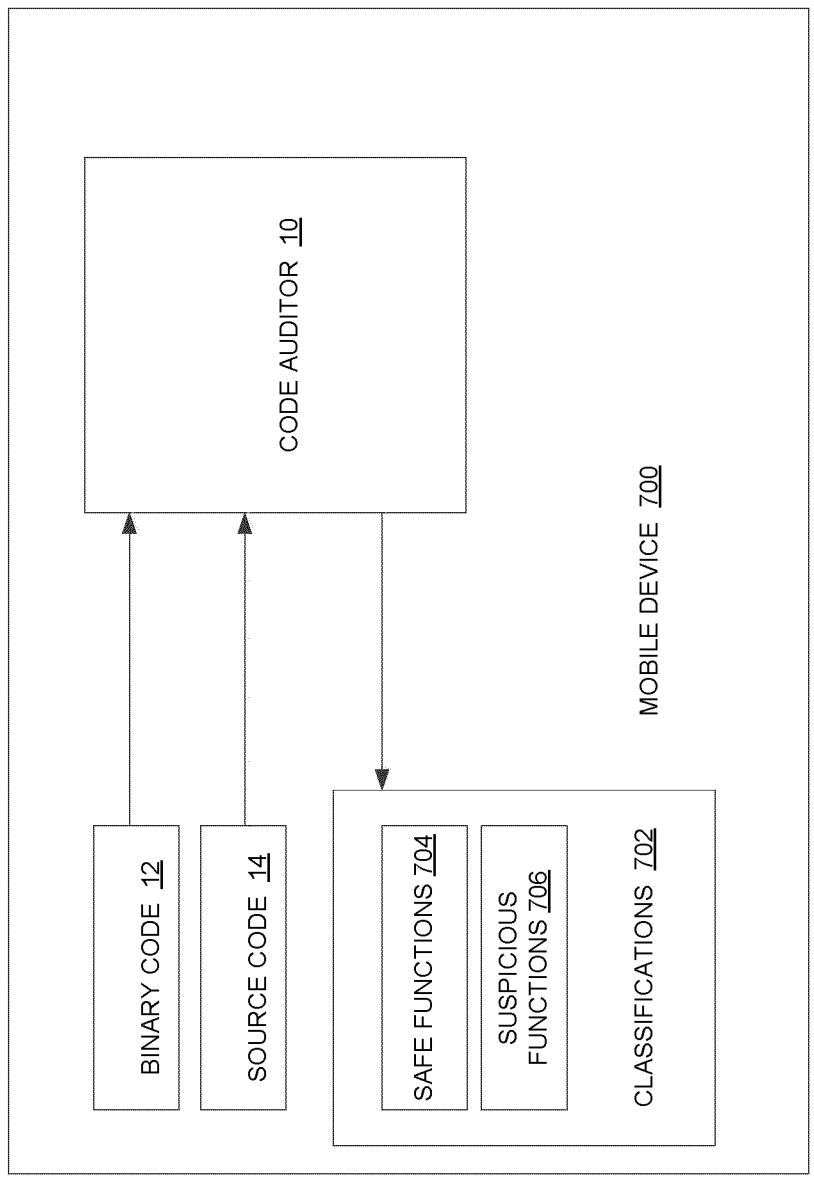

SYSTEM AND METHOD FOR DETERMINING CORRESPONDENCE AND ACCOUNTABILITY BETWEEN BINARY CODE AND SOURCE CODE

CROSS REFERENCE TO RELATED APPLICATION

This application claims the benefit of and priority to U.S. Provisional Application No. 62/338,423 filed May 18, 2016 the contents of which is hereby incorporated by reference.

TECHNICAL FIELD

Embodiments relate to tools for detection of malicious code in software.

INTRODUCTION

Security sensitive organizations perform source code audits on software they use. However, after the audit is performed, they must still perform a binary code audit to ensure the binary provided to them matches the source code that was audited.

Example work on analysis and detection of malware and vulnerabilities in binary include: BinDiff, which matches binaries using a variant of graph-isomorphism; BinSlayer, which performs bipartite matching using the Hungarian algorithm; Blanket Execution, which matches functions in binaries, with the goal of either classifying malware or aiding automatic exploit generation; BinHunt and its successor iBinHunt, which redefine graph-based matching problem as maximum common induced subgraphs isomorphism problem; discovRe, which uses a loose matching algorithm to match binaries using structural and numeric features of call function graphs; BINJUICE, which normalized instructions of a basic block to extract relationships established by the block and then structurally compared the relationships; BINHASH, which models functions as a set of features that represent the input-output behaviour of a basic block; EXPOSÉ, which is a search engine for binary code that uses simple features such as the number of functions to identify a set of candidate function matches; TEDEM, which automatically identifies binary code regions that are similar to code regions containing a known bug; and backdoor detectors.

Source code can be developed by multiple parties and integrated to create software product. The trustworthiness of a software product is only as good as the least trustworthy principle who contributed to the product. When the number of parties that contribute to a software product increases, the trustworthiness decreases. To establish trust, organizations must thus perform their own auditing of a software product.

SUMMARY

In an aspect, embodiments provide a code auditor and related methods for classifying code elements in binary code into a first category accounted for in source code and into a second category as not accounted for in the source code. In an embodiment, the method comprises extracting, using a first extractor, a source code features from the source code, the source code features including source code functions; extracting, using a second extractor, a binary code features from the binary code, the binary code features including a second set of first set of functions; obtaining, in a matching block, a correspondence between the source code functions and the binary code functions by comparing a comparison selection of the source code features to a comparison selection of the binary code features; and classifying, in an accountability block, each function of the binary code functions into the first category or the second category according to a comparison of an accountability selection of features of the binary code features characterizing the function with corresponding features of the first set of features characterizing the respective function of the first set of functions estimated to correspond with the function. The apparatus may comprise the extractors, matching apparatus and accountability block.

Features can be preserved at compilation and accordingly are present in both the source code and binary code. Code auditor is operable to detect and match features present in both the source code and binary code. If a feature is present in the binary code and not the source code it may be flagged or classified as potentially suspicious.

The code auditor can implement the comparison selection using different matching processes such as a bi-partite match, for example. If a feature is present in both the source code and binary code then there can be a 1-1 match. The code auditor can also detect similar features in the source code and binary code and generate a measure of how good the match is. The code auditor can find an optimal set of 1-1 feature pairs in the source code and binary code that maximizes overall code level correspondence. The code auditor can use machine learning for example, to extract features and find the optimal set of 1-1 feature pairs in the source code and binary code. The code auditor can use machine learning to find which features pairs are more useful for matching. Key features can be parameters for the function call for graph edges and string literals, for example.

The code auditor can implement the accountability selection to characterize a feature that is present in the binary code and not the source code as potentially suspicious. Malicious code can be present in the binary code and not present in the source code and code auditor identifies and flags this malicious code. Key features for accountability can be the same features used for matching, for example.

In an aspect, embodiments provide a code auditor and related methods for classifying code elements in a second body of code into a first category accounted for in a first body of code and into a second category. In an embodiment, the method comprises extracting, using a first extractor, a first set of features from the first body of code, the first set of features including a first set of functions; extracting, using a second extractor, a second set of features from the second body of code, the second set of features including a second set of functions; obtaining, in a matching block, a correspondence between the first set of functions and the second set of functions by comparing a comparison selection of the first set of features to a comparison selection of the second set of features; and classifying, in an accountability block, each function of the second set of functions into the first category or the second category according to a comparison of an accountability selection of features of the second set of features characterizing the function with corresponding features of the first set of features characterizing the respective function of the first set of functions estimated to correspond with the function. The apparatus may comprise the extractors, matching apparatus and accountability block.

BRIEF DESCRIPTION OF THE FIGURES

Embodiments will now be described with reference to the figures, in which like reference characters denote like elements, by way of example, and in which:

FIG. 6 shows code for an example binary with functionality inserted that was not present in the source code;

FIG. 7 is an example schematic of a system with the code auditor on a mobile device according to some embodiments;

DETAILED DESCRIPTION

Figure 1:
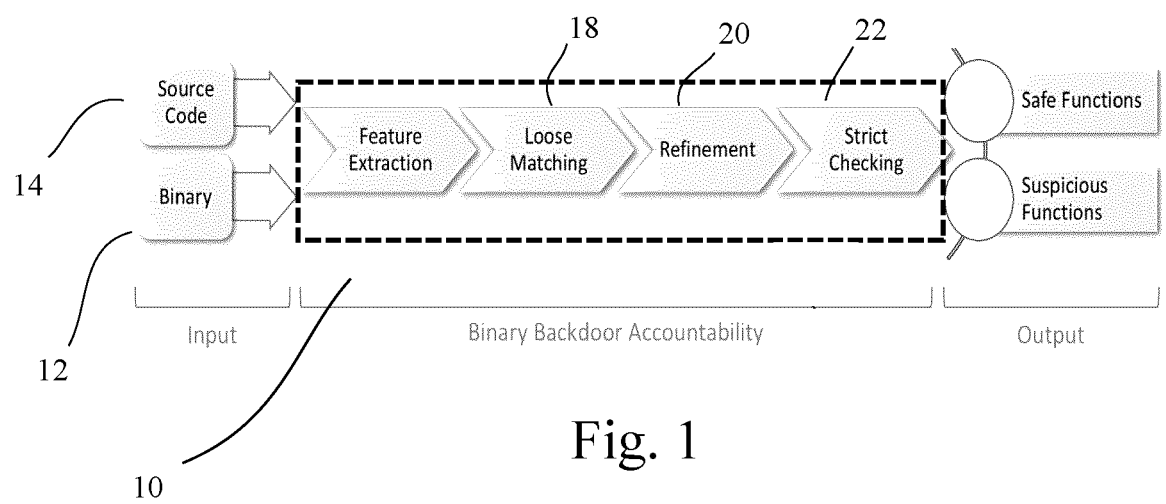
FIG. 1 is shows operation of a code auditor.

Modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

Embodiments described herein relate to a code auditor that reduces the effort required to audit both the source code and the binary code. For Binary Backdoor Accountability the code auditor can identify the sections of the binary code whose provenance can be accounted for in the source code such that if the source code is free of backdoors, then the binary code is also free of backdoors. Accounted for code does not need to be inspected during the binary audit, saving manual effort by auditors. In some embodiments, the code auditor can compare a binary code that is produced by compiling a source code. In some embodiments, the code auditor may compare any two codes where one is a transformation of the other, and the codes each have a call graph.

Binaries can be stripped of symbols and compiled with a compiler that the customer does not have access to, which might arbitrarily apply a variety of compiler optimizations during the process of transforming source code into a binary. As a result, a challenge for the code auditor is differentiating between differences in binaries and source code that are due to legitimate compiler optimizations and differences due to a backdoor that has been inserted in the binary after a source code audit. To overcome this, the code auditor identifies code features that are invariant under most compiler optimizations, but would be modified if a backdoor is inserted. For other optimizations that do alter these features, the code auditor uses machine learning to train to predict when these optimizations are likely to be applied to account for them.

Proving equivalence between two programs is equivalent to the halting problem, and can be undecidable. For the same reason, it can be difficult to prove that compilers produce binary code that is equivalent to the input source code. Rather than try to prove equivalence between a binary and source code, in some embodiments, the code auditor can detect another property, Binary Accountability. Binary Accountability aims to identify the functions in a binary that are accounted for by functions in some corresponding source code.

As an example, the call graph of binary B is accountable by the call graph of source code S if and only if every function in a non-empty set of functions b in B matches a non-empty set of functions s in S. The inverse is not true—functions in S do not have to match a function in B because source code can be present but not included into the final binary or the compiler may optimize some source code functions away.

According, binary code and source code can have a call graph. The code auditor can determine the accountability of binary code if the call graph of binary code is accountable to the call graph of source code when a set of binary code functions match a set of source code functions. The set of binary code functions can correspond to or be characterized by an extracted set of binary features. The set of source code functions can correspond to an extracted set of source code features.

In the above example formulation, match is a function that will return true if b is produced from s under benign compilation, but false if a backdoor is inserted into b that is not present in s. A backdoor inserted into the binary is malicious code that: 1) specifies malicious functionality that is not present in the source code and 2) that malicious functionality should be triggered only under very specific circumstances so as to remain stealthy. In some cases, the backdoor could be a large amount of functionality, such as making additional network and file system calls, features found in many remote access tools. These give a remote attacker access to nearly unlimited functionality on the victim machine. In other cases, the additional functionality could be as little as an additional code path that allows an attacker to bypass authentication with a hard-coded password or secret keyword, such as that found in various well-documented backdoors. In this case, the attacker only has access to legitimate functionality in the binary, but in many cases this is still enough functionality to do a great deal of damage. While these two classes of backdoors are not exhaustive, a great majority of backdoors can fall into one of these cases. The code auditor can apply a backdoor threat model based on these two classes for new function calls that eventually lead to system calls are inserted, or for new code paths guarded by hard-coded strings or constants are inserted to make them stealthy.

The backdoor model can exclude backdoors that are built around vulnerabilities. For example, if an attacker inserts a memory corruption vulnerability that they can later exploit to inject new code or perform a return-oriented-programming attack, then the new functionality does not appear in the binary, but is instead injected at exploit time. Since binary accountability is a static analysis technique, it cannot analyze new dynamically injected functionality.

The code auditor can apply to binaries or other code from which a call graph can be determined. For a binary code, the binary code should be able to be reliably disassembled using a disassembler. The code auditor may not catch obfuscated backdoors that disassemble to normal-looking code (for example, by overlaying 2 different instruction streams over the same binary values). However, this requirement raises the level of difficulty for the attacker considerably. For source code, the source code can be parsed by the code auditor, for example if the source code is a readily available dialect of C or C++. Undefined or incorrectly defined symbols may be avoided, for example by access to values used in processor directives or by including a front end in the code auditor that ignores undefined symbols and accepts mismatched types.

A difficulty with determining binary accountability is the code transformations compilers apply to optimize the compiled binary. Fortunately, many optimizations are orthogonal to binary accountability as they do not introduce or remove system calls, nor do they affect hard-coded strings or constants used in a binary. The following are examples of code optimizations performed by compilers. These are examples only.

Inlining.

This optimization moves a callee function into the body of a caller function, essentially removing the callee from the binary. In addition, a new function can be created that will be a mix of the features of both the original callee and caller. Inlining makes binary accountability hard because two or more functions in the source code must be properly matched to a single function in the binary. The code auditor handles arbitrary inlining.

Library Call Substitution.

Compilers may have standard library-specific optimizations that substitute library calls for a more efficient version under certain circumstances. In many of these cases, these library calls may make different system calls. Binary accountability may properly disambiguate these benign optimizations from modifications that would result from an addition of a backdoor in the binary.

Local Optimizations.

Compilers also optimize control-flow basic blocks to improve the performance of the execution. For example, optimizations such as loop unrolling may significantly change the structure of the control-flow graph. In addition, register allocation optimizations can obscure the number of parameters passed to a function at certain call sites if the compiler determines that the appropriate argument is already in the appropriate register.

String Modification.

Compilers may insert new string constants in the compilation process (i.e. standard pre-defined macros such as for example _FUNC_ or _FILE_), as well as modify existing ones (for example, perform statically-resolvable string substitutions for format string functions).

Compiler-Inserted Functions.

Compiler will sometimes insert calls to helper functions. For example, GCC will insert calls to _stack_chk_fail to detect stack overflow. These functions appear in the binary but not in the source code. The code auditor will flag these functions as unaccounted for since they do not have a source code equivalent. However, they are easily recognizable and can be easily white listed by users.

In an embodiment, the code auditor computes binary accountability by comparing a function in the binary with a corresponding function in the source code. This comparison checks for differences in code features that could indicate the presence of a backdoor. Pairs (e.g. binary code feature and source code feature) that show no differences in these features are labeled as "safe", and can be trusted to not contain a backdoor. Pairs where the code auditor detects differences may be different due to compiler optimizations. If the code auditor can determine that the difference is due to a benign optimization, the binary function is also labeled "safe". The code auditor can conservatively mark all binary functions as "suspicious" when it could not determine if the differences are due to the compiler, and this set of functions must be audited by a human to determine if a backdoor is really present or not. This comparison procedure can be referred to as Strict Checking.

However, before the code auditor can perform strict checking, it can first determine which functions in the binary correspond to which functions in the source code. The binary is stripped of symbols. The code auditor can determine this mapping. An approach might be to start at the entry points of both binaries (i.e. main( )), and then perform a traversal of the call graph, but this might not work for two reasons. First, a function could have several callees, and there must be a way to disambiguate the callees. Second, edges in the call graph are often incomplete because of computed function pointers, whose target cannot be determined statically. As a result, the code auditor performs an iterative Loose Matching phase that uses various code features to determine the most likely source function that will match a binary function. In cases where loose matching is unable to find a good match for a binary function, these binary functions will be labeled as unmatched or multi-matched, and also require a human auditor to determine if they are new functions inserted as part of a backdoor or not.

Binary accountability is intended for scenarios where the user has very high security requirements, and has already committed to spending a large amount of human resources on code auditing. In such cases, the user is willing to tolerate a high false alarm rate because the current situation is that human auditors examine the entire binary anyway. Binary accountability is a cost saving tool whose purpose is to determine what parts of a binary need not be audited by a human. As a result, in an embodiment, the code auditor is designed to 1) take advantage of the fact that it has source code to perform accountability and 2) be very conservative in marking binary functions as safe as they will not be examined further by a human auditor.

A criterion for the utility of the code auditor is how many functions it can safely determine to be free of backdoors according to the backdoor model and thus save the human auditor from having to spend manual effort on and whether it can ever mistakenly mark a binary function that contains a backdoor as safe.

FIG. 1 shows the work-flow of a code auditor 10. The code auditor 10 configures a processor to execute instructions to implement the work flow. A binary code 12 and source code 14 are the input to the system 16, where the code auditor 10 extracts code features from them. Next, the code auditor uses the extracted features to perform loose matching 18 to identify corresponding function pairs in the source code and binary. A refinement phase 20 then helps disambiguate functions that lose matching was not able to uniquely pair together. Finally, the strict matching phase 22 checks the function pairs to determine if there are any differences that cannot be accounted for by benign compiler optimizations.

Figure 4:
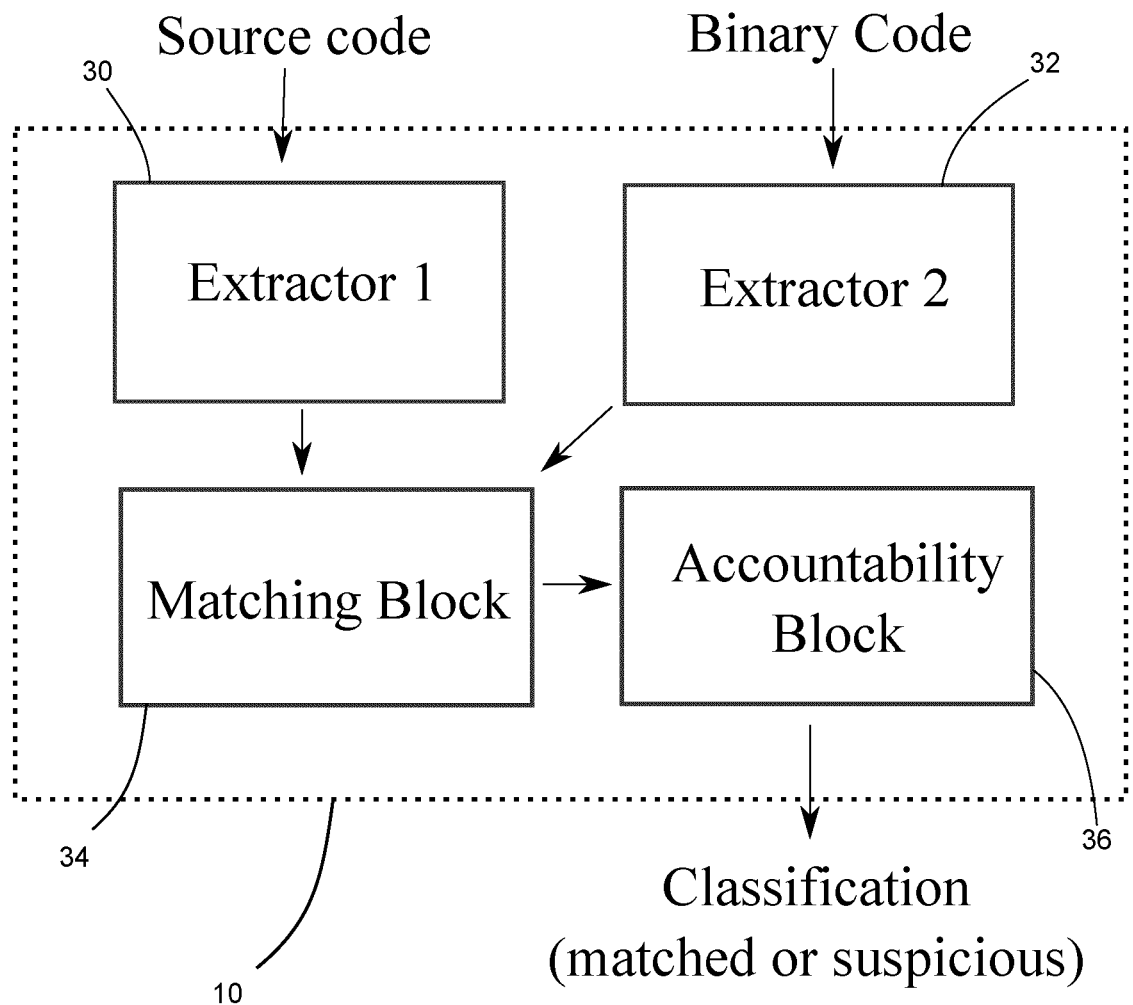
FIG. 4 shows an exemplary code auditor apparatus.

The code auditor 10 can be implemented, for example, by programming a computer with a processor and memory. However, it could also be implemented as a hardwired structure for implementing the specific algorithms described. These implementations are equivalent, so that a general purpose computer programmed as described takes on a physical structure, e.g. by arrangement of electrons and holes within transistors, and distribution of charges creating voltages, that is a physical structure that implements the algorithms described. FIG. 4 shows an exemplary code auditor apparatus. An extractor is configured to accept as input a first set of code (e.g. source code) and extract from the code a first set of features including a first set of functions, and to accept as input a second set of code and extract a second set of features, including a second set of functions. The extractor may be, as shown in FIG. 1, separated into a first component 30 for extracting features from the first set of code and a second component 32 for extracting features from the second set of code. A matching block 34 is configured to obtain a correspondence between the first set of functions and the second set of functions by comparing a comparison selection of the first set of features to a comparison selection of the second set of features. An accountability block 36, which functions as a classifier, is configured to compare an accountability selection of features of the second set of features characterizing functions of the second set of functions with corresponding features of the first set of features characterizing the corresponding functions of the first set of functions to make a determination of the accountability of the second set of functions in terms of the first set of functions. These blocks may be components of a dedicated hardwired device. The blocks may also be implemented on a computer which may include one or more hardware processors and a computer recordable storage medium, or memory, coupled to the hardware processors. The extractors, matching block and accountability block may be programmed as computer executable program code, or as extractive logic, matching logic and accountability logic within the memory.

To help explain the operation of the code auditor, consider a running example, as exemplified by a toy game application with example code listed below. In this simplified example, the user inputs the name and the level he/she wants to play. Depending on the level users input, they play beginner or advance mode of the game. However, a backdoor is inserted in the binary of the game, which is shown in FIG. 6. If the user enters LegendaryHack name, then he/she unlocks extreme level, which is hidden in the game play. Using this example, each of the code auditor's phases will be described in detail.

```
void advance(char *name, int level) {
    if (name == NULL) return;
}
void beginner(char *name, int level) {
}
    void start(char *name, int level) {
        if (level < 5) beginner(name , level);
        else advance(name , level);
    }
    inline static void init () {
        printf (" Initializing...\n");
    }
    int maxTen(int level) {return level %10;}
    void main (int argc , char ** argv) {
        init ();
        int level =0;
        printf ("Enter level: ");
        scanf ("%d", & level);
        level = maxTen(level);
        start (argv [1], level);
    }
```

Both source code and binary are abstracted by extracting the same set of features, and comparing the features. Matching features are selected that are 1) mostly invariant under compiler optimizations and 2) should change if a backdoor is inserted and 3) appear commonly enough in source code and binary to be useful for matching.

Predictive features are extracted that are only available in the source code, which they cannot be used for matching but may be used to help predict when function inlining will take place, which improves loose matching. Example features that can be used for matching and inlining predication are shown in Table 1.

TABLE 1

Features used for matching and inlining prediction.

| | |
|---|---|
| Matching | String constants |
| | Integer constants |
| | Library Calls |
| | Function Call Graph |
| | Control Flow Graph |
| | # of function arguments |
| Predictive | Static Declaration |
| | Extern Declaration |
| | Virtual Declaration |
| | Nested Declaration |
| | Variadic Argument Declaration |
| | Recursion |
| | Computed Goto |

To extract these features, the code auditor 10 extracts the call graph from both the binary and source code, and the features are extracted from each function in the call graph. Both the binary and the source code call graph may be missing edges due to function pointers.

Matching Features.

The code auditor 10 extracts a set of references to string constants from each binary and source code function. Since string constants exist as string literals in the source code and references to the constants section of the binary, these are trivial to extract from both binary and source code. An instance is recorded for each use of the string and the code auditor 10 conducts use-def analysis to ensure it detect the correct number of uses of a string even if it assigned to a variable first before being used. String constants are a feature that is invariant under many compiler optimizations, but tend to be used in guards of backdoors.

Similarly, integer constants are another feature that is suitable for binary accountability. Like string constants, these are extracted into a set that is associated with each function. Integer constants in a binary not only represent integers in the source code, but may also represent various other values such as character constants, enum values and addresses. Constant values such as 0, 1 and −1 may be ignored which are commonly used in functions, leaving other unique integers. Similar to constant strings, constant integers can serve to uniquely identify functions. In addition, an attacker may also break a hard-coded value into several constant integers, so this feature is also necessary to detect backdoors.

Library calls can also help identify and pair functions and are also extracted into a set of library calls that are associated with each function. Unlike string constants, library calls may not be uniquely identify functions, but at the same time it is difficult for the compiler to optimize this feature. Also, rather than call a system call directly, a backdoor may make a call to a library function in an example library like libc, so this feature should be included to ensure that backdoors are detected.

The number of arguments a function takes is also a feature that can help pair a binary function with its source code equivalent. While the number arguments is easily extracted from the source code, it is not always as easily extracted from the binary due to compiler optimizations.

Finally, the function call graph (FCG) and control-flow graph (CFG) of both binary and source code are also used as features. The FCG helps identify and pair functions by checking that paired functions have similar callers and callees. Since a backdoor can be implemented by inserting a call to a function that may lead to a system call, checking callees is also required to ensure that a function with a backdoor is not marked as safe. Using the extracted FCG, the code auditor records the set of caller and callee functions as features for each function.

Function CFGs are often heavily modified during compilation and thus are not a good feature for direct matching. However, the code auditor still uses them during the refinement phase to help disambiguate non-unique matches that arise out of loose matching. However, because of the large changes CFGs undergo, they are not suitable for use during the strict matching phase as they would lead to too many benign differences marked as suspicious. The code auditor does not record the full CFG of each function, but only keeps the number of conditional branches in the CFG for each function. The ternary operator might not have its own conditional node when extracted from the source code. To compensate for this, code auditor 10 can increment the conditional branches in source code functions where there is a ternary operator.

Predictive Features.

A difficulty for the next phase is dealing with function inlining. In the absence of inlining, a binary function will match exactly one source function. However, with inlining, inlined source functions must be combined before their matching features will match the corresponding binary function. Because the code auditor has access to source code, it is able to use code features from the source code to predict which functions the compiler is likely to inline.

Predictive features include features of the function declaration, such as whether it is static, extern virtual, nested or has variadic arguments, and may include features of the function body, such as whether it contains recursion (direct) or a computed goto.

To train a classifier, a set of applications and a compiler may be used. These do not need to be the same application or the same compiler for which the code auditor is trying to determine binary accountability. The intuition is that all compilers follow some common principles of when to inline, which are applied independently of the application being compiled. Thus, this training can be done once for all uses of the code auditor.

The predictor may be trained by building a corpus of inlined and non-inlined functions extracted from a variety of applications. In an example embodiment, this may be used to train an Alternating Decision Tree (ADTree) classifier. The trained classifier is then applied to the source code to be audited. Functions that are classified as likely to be inlined have their matching features copied to their parents. Edges may be added in the FCG from the parent to the children of the inlined function, but the inlined function is not removed from the FCG. The reason is that if the predictor is wrong, then the binary functions will still have a chance to match their corresponding inlined functions. However, if the predictor is correct, then the inlined source code function will simply be left as an unmatched function in the source code.

Figure 2A:
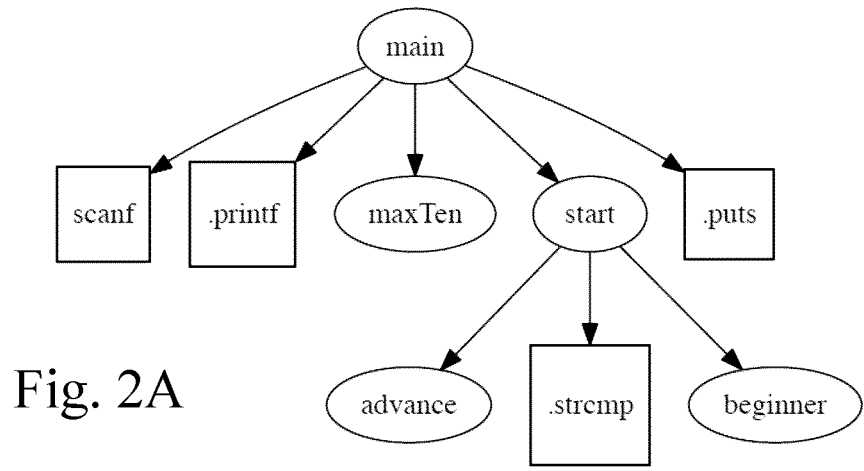
FIGS. 2A, 2B and 2C show respectively function call graphs of an exemplary binary code and source code, and a function call graph after execution of a code auditor's prediction phase, respectively.
Figure 2B:
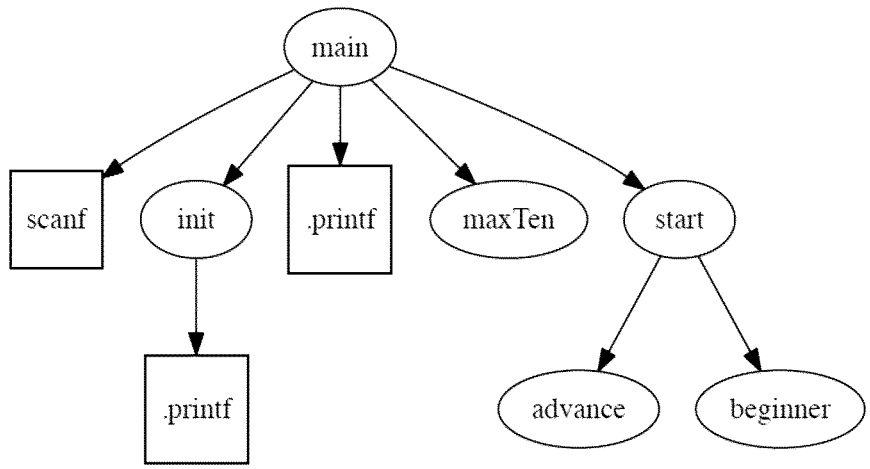
Figure 2C:
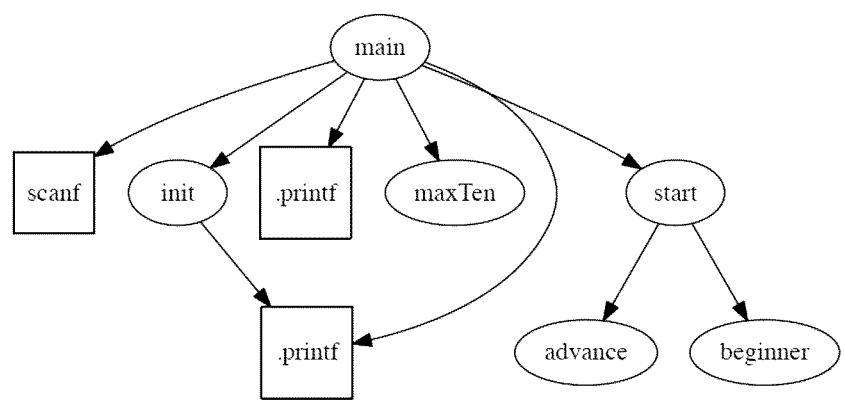

The code auditor extracts the predictive features from the source code and the binary. Example FCG derived from the binary and the source code are shown in FIG. 2A and FIG. 2B, respectively. As observed from the FCGs, init function is inlined in the binary. Using the predictive features, the code auditor correctly predicted init as inlined into main. As a result, the matching features of init (namely the library call to .printf) will be copied into main. However, as noted above, the init node is not removed from the FCG even though it is inlined. FIG. 2C shows the final FCG after the code auditor's prediction phase.

The goal of loose matching is to label every binary function as matched, unmatched or multi-matched. Multi-matched functions are binary functions where loose matching determines more than one potential match. These functions are further refined in the next phase to either matched or unmatched. Functions that are unmatched are labeled suspicious, if the code auditor was not able to find a corresponding function in the source code that it can be accounted to. Finally, all matched functions undergo strict matching to determine the final set of safe and suspicious functions.

After inlining prediction is applied, every function in the binary should uniquely match a single function in the source code. If inlining took place and was predicted correctly then the binary function should match the parent function where the function was inlined. Otherwise the un-inlined binary functions will match their respective source functions. As a result, loose matching is a classic bipartite matching problem.

Figure 3:
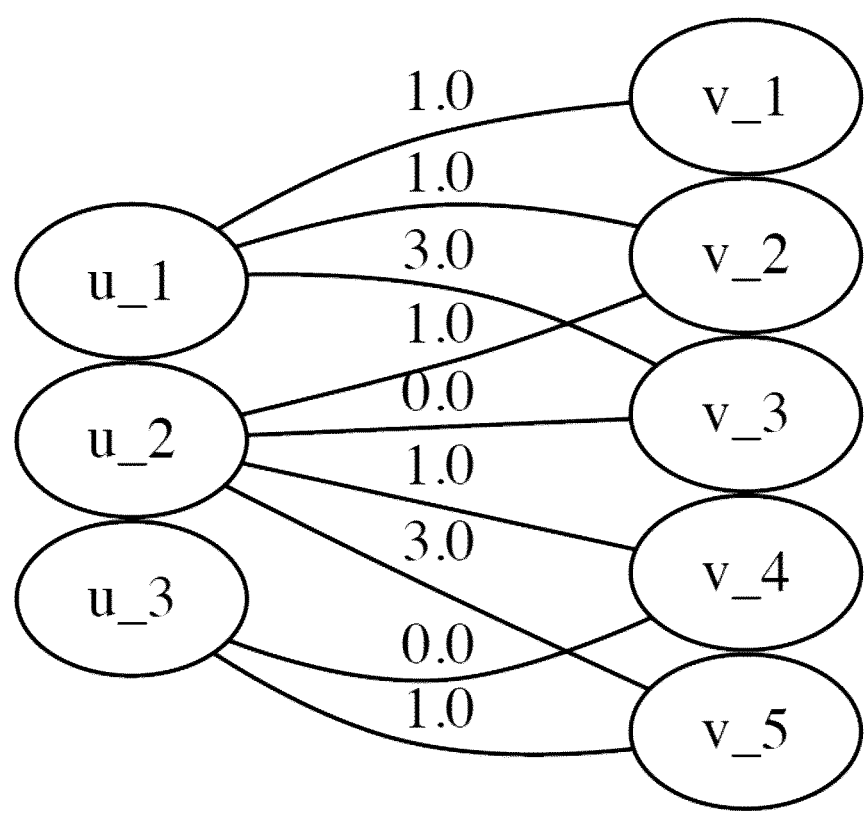
FIG. 3 shows an exemplary weighted bipartite graph.

The functions in the binary and source code can be mapped into a weighted bipartite graph, as shown in a small example in FIG. 3. A bipartite graph is a graph G where the nodes can be divided into two disjoint sets S and B, such that no two nodes within the same set are connected by an edge. Here, one set represents the functions in the source code and the other the functions in the binary. Weighted edges in G connect a node from S to B. An optimal bipartite assignment is determined between the nodes in B and S that minimizes the total weight of the edges between them. This problem is analogous to solving an assignment problem. An example way to solve such problems is to apply the Hungarian algorithm, which produces a sub-optimal solution in polynomial time, O(N3). The code auditor 10 can 1) compute the weight for each edge between B and S and 2) label the pairs of nodes in the resulting assignment as matched, multi-matched or unmatched. In the example embodiment, the code auditor can apply the Hungarian algorithm by the computation and label. Algorithm 1 presents the pseudocode for the matching based on bipartite graph.

---

Algorithm 1 Loose Matching

```
function LOOSE_MATCHING(BinGraph, SrcGraph)
    reGenerateCallerAndCalleeNodes(BinGraph)
    reGenerateCallerAndCalleeNodes(SrcGraph)
    repeat
        ▷ Create weighted bipartite graph
        weights ← 0
        pairs ← 0
        for b ∈ BinGraph do
            for s ∈ SrcGraph do
                weights ← compWeights(b, s)
            end for
        end for
        ▷ Run Hungarian and assign labels
        pairs ← HungarianAlgorithm(weights)
        assignLabels(binGraph, pairs)
    until convergence = true
end function
```

---

Computing weights.

Weights are calculated for each pair of binary/source code functions. For each pair of nodes (an edge) in a bipartite graph, the code auditor 10 can use these set of features to assign a cost. The total weight is a weighted sum of the individual costs of each matching feature:

$$\sum_{i=1}^{N} w_i C_{f_i}$$

where N is the total number of features, w is the weight factor for a feature and C is cost for a feature.

The code auditor 10 can calculate the cost of each feature, $C_f$, on the scale of 0 and 1, inclusive. The cost of 0 means a pair of function is the most similar, whereas the cost of 1 means the pair is least similar. If a pair do not share any common features in an example embodiment the code auditor 10 can assign predefined MAX_COST, otherwise the code auditor 10 can calculate the cost based on features. The way a cost for a feature is computed depends on whether the features is a set, such as for string constants, or whether it is a scalar value, such as for the number of function arguments.

For set features, the code auditor 10 can compute an similarity index between the two sets. An example is a modified Jaccard index. The Jaccard index is computed as follows:

$$J(B, S) = \frac{|B \cap S|}{|B \cup S|}$$

where B and S represent a set feature from a node in the binary graph and source graph, respectively. However, Jaccard index will calculate the same cost for cases where a string is missing in set B and a string is added in set B. Because backdoors are likely to introduce new strings, the code auditor 10 can assign a higher cost if a string is added in B. Thus, the code auditor 10 can use modified version of Jaccard index to calculate the cost:

$$C_f(B, S) = \begin{cases} \frac{|S - B|}{|S|} & \text{if } |B - S| = 0 \\ \frac{|B - S|}{|B|} & \text{otherwise} \end{cases}$$

For the number of function arguments, which is a scalar value, the code auditor 10 can assign a cost of 1 if the source code and binary function do not have the same value and a 0 if they have the same value.

Consider the game example where the code auditor 10 can calculate the cost of string constant feature, f, for the function main in the binary. Since there are only two functions that contain this feature, f is calculated for the two pairs: 1) main from the binary and init from the source code, and 2) main from the binary and main from the source code. The string constant feature contains three strings for the function main in the binary and one string for the function init. For pair 1 the cost $C_{f_1}$ is 0.667, whereas for pair 2 the cost $C_{f_2}$ is 0.333. As a result, the binary main is more likely to match the source code main because of the lower weight these lower costs would result in. A similar effect will occur due to the other features.

Each feature contributes a different amount to the likelihood of determining a correct match. To account for this, each feature's cost is multiplied with a weight factor before being combined into an overall edge weight. The code auditor 10 can determine the weight factor of each feature using Sequential Minimal Optimization (SMO) to train a Support Machine Vector (SMV) machine learning classifier in an example implementation. Once the training is completed, the code auditor 10 can obtain the weight factors of each of the features according to their importance determined by the SVM.

One challenge is that while nodes in both binary and source code functions contain a set of callers and callees in the FCG feature, the contribution of components towards the total edge weight cannot be computed initially because there is no mapping between callers and callees. That is, functions in the source code are identified by function names, but functions in the binary are identified by their addresses, and it is the mapping between those that code auditor 10 can try to compute. The code auditor can work around this problem by iteratively computing the edge weights, performing assignment and labeling the functions. The code auditor can perform Hungarian assignment, for example. On each iteration, the code auditor 10 can match some number of binary/source code functions, and these matches are then used to compute costs in the FCG feature for the next iteration. These iterations are then performed until the resultant changes converge.

Labeling Functions.

Once weights are assigned to each edge in the bipartite graph, the code auditor 10 can determine an assignment that minimizes the weights of the edges. This may be using the Hungarian process, for example. Each pair of functions in the resultant assignment can have an edge weight that is either unique, equal to some other pair or MAX COST. A unique weight means that the binary function has no other edge between it and another source function with the same weight. Such binary functions are labeled as matched. In other cases, there can several edges whose weights are equal to the weight of the edge between the binary and the source function that the Hungarian algorithm assigns. In these cases, the used features cannot definitively match a single function so these will be resolve during refinement. The code auditor 10 can label the binary function as multi-matched and note the other source functions that have equal weight. Finally, a pair that has MAX COST is labeled unmatched because the binary function has no features in common with the source code function.

Recall that after labeling, The code auditor will update the edge weights of the FCG caller and callee features based on the new labels. After each iteration, more functions will be marked as matched, and these matched functions affect the number of elements that intersect when computing the modified Jaccard Index. As a result, this increases the contribution that the FCG caller and callee features make during loose matching for each iteration, allowing more matches to be identified.

For example, let us consider functions main and start in the binary, which would be labeled as matched after the first iteration due to its features. Once this match is found, it allows the code auditor to learn the corresponding functions in source and binary, and enable it to disambiguate advance and beginner from maxTen in the next iteration since start calls advance and beginner while main calls maxTen.

Refinement.

At this point all binary functions have been labeled as matched, multi-matched or unmatched. As an optional step, refinement uses CFG features to disambiguate the multi-matched binary and source code functions that have the same edge weights between them. To do this, the code auditor 10 can perform a procedure similar to loose matching on these functions. However, unlike in the case of loose matching, the edge weights in this bipartite graph are determined solely from the number of conditional branches in the CFG feature (recall that this feature is not used in loose matching in the primary embodiment described). The cost of CFG feature is the difference between the number of conditional branches:

$$C_{cfg}=|N_b-N_s|$$

where $N_b$ and $N_s$ is the number of conditional branch feature for the binary node CFG and source node CFG respectively. The code auditor 10 can again run the Hungarian algorithm on the bipartite graph and re-label the nodes in this smaller bipartite graph based on whether the resultant assignments have a unique, non-unique or MAX COST weight.

For example, the function advance in the toy game contains one conditional branch in both the binary and the source code. This function will thus be labeled as matched.

Strict Checking.

At this point, the code auditor has determined the best source code function that it can find for the matched binary functions. The code auditor classifies each of the binary functions as accountable in terms of the source code function or as not accountable (including unknown). Every binary function that is still unmatched or multi-matched is marked as suspicious (classified as unaccountable) and will be manually audited. However, functions that are labeled matched are marked as safe (classified as accountable) and won't be audited. As a result, to ensure they are truly safe, the code auditor performs strict checking to determine if there are differences between their features that could indicate the presence of a backdoor.

The code auditor checks the string constant, integer constant, callee and library call features of every pair of matched functions for strict equivalence. An inserted backdoor is likely to change one of these features. The string constant, integer constant, callee and library call features are used during loose matching so one might wonder why the code auditor 10 can allow functions that differ in these features to be matched at all during loose matching. The reason is that when the code auditor 10 can be strict during the matching phase, this can result in very few matches being found at all due to compiler optimizations. Since very few matches could be found, loose matching could not "bootstrap" itself and find callees and callers during the iterations during the matching phase. As a result the callee and caller features are not as helpful and many functions that would have been matched and pass strict checking were never matched in the first place. Thus, it is better to have some functions that are slightly different due to compiler optimizations be matched so that their callers or callees can, which might be exactly the same can also be matched during loose matching.

Considering the game example, the functions main, start, advance and beginner can be matched respective to its source code functions in the Loose Matching and Refinement stages. In the Strict Checking phase, these matched functions are compared, for instance advance from the binary will be compared with advance from the source code. After comparison the advance can contain additional string constant in the binary than the source code and, thus the code auditor flags the function as suspicious for manual checking.

One possible reason that equivalent functions might not pass during strict checking is due to an instance where function inlining occurred in the binary, but was not predicted to happen during loose matching. As a result, the inlined features from the inlined callees will appear in the binary function, but not in the matched source function. To prevent this misprediction from causing correct matches to be labeled as suspicious, strict checking accounts for inlining by recursively searching the children of a mismatched source code function for any additional features found in the binary function. To avoid searching to the entire sub-graph, the code auditor only checks for inlined feature at a maximum depth of two levels in the embodiment described. This means that the code auditor only check the callees and their children functions. Since compiler optimizations may add or remove integer constants, the code auditor uses a threshold and treats differences in integer constants less than the threshold as the same. In our code auditor prototype, an example threshold of 8 can be used.

While the code auditor is able to correctly match many binary functions with the correct source code function and determine the absence of a backdoor, there are still anywhere from 10-35% of functions where it is unable to do so. The main reason for this is benign compiler optimizations. Since static compilers cannot use dynamic profiles to guide when to apply optimizations, they often must rely on complex algorithms to determine optimizations should be applied. With the exception of inlining, it may be ineffective to try to predict when these other optimizations will occur.

Two design features in the code auditor enable it to achieve matches despite these optimizations. First, the code auditor allows functions with some minor differences to still match during loose matching. Second, the code auditor only uses features that a backdoor would affect during strict checking. For example, a commonly applied optimization that the code auditor does not try to predict is loop unrolling, which will increase the number of conditional branches used in the CFG feature. However, this optimization has only a minor effect on the final result of the code auditor since it is only used during the refinement phase.

Another optimization is register allocation and spills to the stack. On the x86-64 processor architecture, there are 6 dedicated registers used for passing arguments in a function call (rdi, rsi, rdx, rcx, r8, r9). The code auditor 10 can use these registers to calculate the number of arguments feature for binary functions. However, due optimizations definitions and uses of these registers may be removed making it difficult to tell which registers are live at a function call site. As a result, machine learning can place a low weight factor on this feature, meaning that it only came into play when all the other features between two functions were very similar.

Compilers may also perform library call substitutions that replace some standard library calls with more efficient versions if the call-site arguments permit it. While these differ widely from compiler to compiler, and thus are a poor target for training unless one has access to the compiler itself (something the code auditor does not assume), they are fairly easily recognizable by a human auditor, as they are almost universally applied to standard library functions and a human who understands the semantics of the library calls would be able to easily determine their equivalence (i.e. replacing printf with puts or vsprintf). Thus, the code auditor can be configured with a white list of such substitutions. Once the auditor notices a compiler making such substitutions, they can add the substitution to the code auditor's white list and run the code auditor again, which prevents it from incorrectly flagging these substitutions as suspicious. A similar white list also exists for compiler-inserted functions.

Finally, the string constant and function caller-callee relationships can be rarely modified by compiler optimizations, making them reliable for both loose matching and strict checking. In an example embodiment, these three features can be given the heaviest weight factors by the machine learning rules used by the code auditor 10. The major case where compilers insert strings are with preprocessor defined strings. Another more obscure case was where format strings that contained a substitution that could be statically resolved (i.e. sprintf(str, "% d", 5)) might be performed at compilation time. While some pre-processor inserted stings such as _LINE_ or _FILE_ can be resolved since the code auditor theoretically knows the file and line where the macro appears, in general, these string substitutions are difficult to white list as the inserted string can be very dependent on the environment where the binary was compiled (i.e. the date or compiler version). As a result, the current prototype code auditor does not white list any compiler-generated string constants.

Extracting and Comparing Features.

The code auditor 10 can extract features from source code. The code auditor can extract features from binaries. The code auditor implements binary accountability on the two sets of extracted features. The source code feature extraction component of the code auditor can be implemented by extending the ROSE compiler framework with 1907 LOC. An example code auditor can access the build scripts of an application (i.e. Makefiles) to extract compiler directives so that preprocessor macros and include files resolve properly. The dependency may be eliminated by removing type checking, permitting the use of undefined variables and searching the source tree to resolve include files. The source code extraction feature processes each source file individually and outputs each function as a description. The functions are then linked together along with the other source features, scripts and libraries.

Binary features can be extracted using different programs. To extract the number of arguments, code auditor can extract the necessary binary features to compute the number of arguments. The code auditor can take into account compiler idioms such as xor r8, r8, which appear to be reading register r8, but are in fact just initializing it to zero. Unfortunately, due to control-flow imprecision, statically determining dynamic instruction ordering is not always reliable. As a result, the code auditor can extract the wrong number of arguments.

The example matching phase described is implemented in 12,110 lines of JAVA™ code in an embodiment. The example implementation can be used with an example Graph Matching Toolkit framework, which provides an implementation of the Hungarian algorithm. Most of the code in the framework has been modified and updated to include the loose matching, and refinement and strict matching phases.

Machine Learning.

In some embodiments, code auditor 10 can train machine learning classifiers for inlining prediction during feature extraction and to compute the optimal weights for edge weight calculation during loose matching. The likelihood of inlining and the relative importance of the features can be dependent on when the compiler applies optimizations, which can change depending on the optimization level that is passed to the compiler. For example, there can be four standard optimization levels in GNU GCC compiler. The GCC flag -O0 will turn off all optimizations, whereas -O1 will turn on 31 different optimizations. The flag -O2 will turn on another 26 optimizations and -O3 additional 9. The code auditor 10 may not know the optimization level the binary to be audited has been compiled with, or even whether it was compiled with GCC or not. As a result, the code auditor 10 can train with a mix the -O2 and -O3 optimizations levels, as example optimization levels for production code. Other training levels can be used in various embodiments.

To train the inlining prediction classifier, the code auditor 10 can use a corpus of training applications. In an example embodiment, each application can be compiled twice, once with -O2 and again with -O3 compiler optimization levels. The code auditor 10 can use debugging symbols within the compiled binaries to divide the functions into a set that were inlined and a set that were not inlined. For each application, the code auditor 10 then selected the smaller of the two sets (usually the set that was inlined) and randomly select an equal size set of functions from the other set making a set of functions that is 50% inlined and 50% not-inlined. For each function, the code auditor 10 extracts a feature vector containing the predictive features for the function. The code auditor 10 can then aggregate these functions and feature vectors across all applications and train an inlining predictor. The resulting predictor can be used by the code auditor 10 to predict whether a function will be inlined or not using predictive features.

The edge weights for loose matching are computed by the code auditor 10 using a similar procedure. Again, the code auditor 10 can use a corpus of applications and compile each application using GCC, but only at the -O2 optimization level so that only functions that are very likely to be inlined get inlined. The code auditor 10 can then exclude all the inlined functions. Using the ground truth for which source function matches which binary function, the code auditor 10 can then create a set of function pairs for each application composed of 50% correct matches and 50% incorrect matches. Inlined functions are excluded because the code auditor 10 cannot always combine the callee and caller features correctly, and these errors pollute the training set. The code auditor 10 can then train the weights so that the SVM classifier is able to maximally classify these two sets correctly across all applications in the training set. During the evaluation, the code auditor 10 performs a 5-fold cross evaluation across our 10 applications. The code auditor 10 tabulates the average computed weights from this 5-fold evaluation. Example results in Table 2, which shows that FCG callee and callers, as well as string constants are the main features used for matching as they have the heaviest weights. This is an illustrative example and non-limiting.

TABLE 2

Average weights of the features used in Loose Matching phase

| Feature No. | Feature Name | Weight |
| --- | --- | --- |
| 1 | string constant | 1.469 |
| 2 | integer constant | 0.6315 |
| 3 | library calls | 0.2828 |
| 4 | caller functions | 2.9293 |
| 5 | callee functions | 2.9293 |
| 6 | # of arguments | 0.9296 |

Evaluation.

Example embodiments for the code auditor can be on virtual machines running Ubuntu™ 14.04 on Intel™ Core i7-2600 CPUs (4 cores @ 3.4 GHz) with 16 GB of memory. An example study can be a set of 10 applications: Proftpd 1.3.4b, Busy-box 1.23.2, Apache (HTTP) 2.4.12, Bind 9.10.2, Mongoose 2.1.0, OpenSSH 7.1p2, Dropbear 2015.71, OpenVPN 2.3.10, Transmission 2.84 and Lighttpd 1.4.39. Applications can be compiled with GCC 4.8.2 with optimization level −O2 and −O3, and the ICC Intel™ compiler 15.0.3 with the highest optimization level −O3.

The code auditor can mark binary functions with various backdoors inserted into them as suspicious. In the absence of backdoors, what percentage of binary functions does the code auditor correctly mark safe and consequently how much binary auditing effort does the code auditor save.

Identifying Backdoors.

The code auditor can flas backdoors as suspicious when they are inserted in binaries and accounted against source code that is free of backdoors. An example can be backdoors in ProFTP, Apache, Dropbear and Juniper™'s ScreenOS™. In cases where there is not access to the actual backdoor binaries, it can be implemented based on the descriptions of the backdoors. Examples may relate to source code for ScreenOS™ and its backdoor can be implemented in Dropbear. The ProFTP, DropBear and ScreenOS™ backdoors all use hard-coded strings to access hidden functionality. Since the code auditor can flag binary functions with extra string constants, it can flag all the binary functions containing these backdoors as suspicious. The Apache backdoor is more sophisticated in that a GET request with a special string to decrypt to a particular format when decrypted with the requester's IP address. In this case, the code auditor can detect an additional function call within the binary function with the backdoor, which is used for comparing the input string with the encoded string.

In some embodiments, these real backdoors are flagged as suspicious by the code auditor 10 because they do not hide their presence from static analysis tools. To further evaluate the resilience of the code auditor 10 to evasion, consider an example of an adversary who is aware of how the code auditor 10 works, but is still constrained by the backdoor model. There are different ways an adversary could insert a backdoor. Example backdoors on Mongoose, Proftpd and Dropbear are as follows:

Strings as individual characters. Instead of encoding a hard-coded string as a string constant, the attacker embeds the string check directly in the code as a series of comparisons against individual characters of the string. This avoids having a string constant. However, it increases the number of conditional branches and integer constants because each comparison requires an integer constant and a conditional branch causing the code auditor 10 to classify it as suspicious.

Compute a hash of the string and compare the resulting value. Instead of comparing the string directly, the adversary hashes the string using a hash and compares the hash value to reduce the number of conditional branches and integer constants. Comparing an MD5 hash only requires 4 comparisons with 4 integer constants, which is below the code auditor's threshold. However, calling the MD5 function adds a function call, which causes the code auditor 10 to mark the function as unmatched and label it suspicious. If the adversary inlines the MD5 hash function to avoid calling a function, then The code auditor 10 can detect an increase in the number of integer constants and branches due to the MD5 code and marks the function as suspicious.

Calling an intermediate function. Instead of directly calling a library function for string comparison, code auditor 10 can call a local wrapper function, which calls a library function. In this case, the code auditor 10 no longer matches the binary function no longer to its source code function and the binary function is labeled unmatched, causing the code auditor to eventually label it as unmatched. This eventually causes the code auditor 10 to label the function as suspicious.

Calling an existing function. The adversary can find a function that already makes a call to the MD5 function and put the backdoor in that function. However, the code auditor tracks the number of calls to each function in its callee list, causing the binary function with the backdoor to not match its source function, resulting in it being labeled as suspicious.

Use an existing string constant in the function. Instead of introducing a new string constant or a string constant from another function, which the code auditor 10 can flag, the attacker could try to re-use an existing string constant that the function is already accessing in their backdoor. However, because the code auditor counts the number of string constant accesses, this still fails strict checking and the function is labeled as suspicious by code auditor 10.

Assign an existing string constant to a local variable. Instead of using the string constant twice, the adversary modifies the function to assign the string constant to a temporary variable and modifies the original use to use that variable. A temporary variable can be used in the backdoor. However, the code auditor 10 can take use-def chains into account when computing the number of string constant references, so this backdoor can also be caught during strict checking.

Portknocking. Instead of preventing accidental discovery of the backdoor with a long string constant, the attacker uses port-knocking to hide the presence of the backdoor. However, port-knocking introduces new library calls to listen to the various ports in the sequence, which can cause the code auditor 10 to flag the function as suspicious.

For example, an adversary could find one or a series of existing checks for obscure errors (an out of memory error for example) set a global variable if it is triggered. The global variable then triggers some existing functionality that is useful to the attacker. However, this increases the difficulty of using this backdoor as the attacker must find error paths that are not likely to be triggered by accident, yet must be easy for the attacker to trigger from an external interface. A code auditor can detect backdoors placed on obscure paths and triggered indirectly via a variable or other dependency would be able to detect such an attacker.

In another instance, the attacker could use a very short string (less than 7 characters long) as the hard-coded string that triggers the backdoor. Due to local optimizations, in some embodiments, the code auditor can allow differences in conditional branches and integer constants below some threshold and a small enough increase in these may not cause the code auditor to mark a function as suspicious. However, using a short string increases the chances that the backdoor might be triggered accidentally or during blackbox testing. In some embodiments the code auditor 10 can prevent any type of backdoor from being marked as accounted for.

Figure 5:
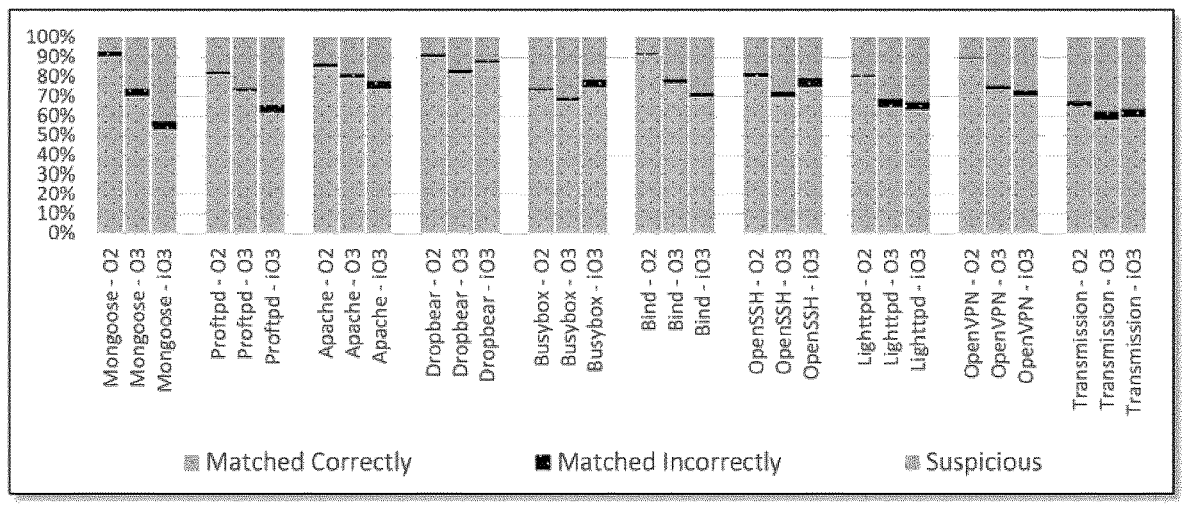
FIG. 5 shows results of applying an embodiment of the code auditor to a set of benign programs.

An example report can evaluate how much binary auditing effort the code auditor can save by evaluating the percentage of functions marked safe by the code auditor when performing binary accountability on benign binaries. An illustrative example can involve a 5-fold cross validation for training the inlining predictor and matching weights when running the code auditor on 10 example applications. The code auditor can find white-list the standard library function substitutions. The code auditor 10 runs again with the extracted white-list and example results are shown in FIG. 5. In this example, the code auditor is able to match an average of 76.5% of the binary functions across the 10 applications and 3 compiler-optimization combinations, reducing the binary auditing effort by more than ¼ on average.

Different embodiments can enable the code auditor to match case with very few matching features, different functions that have similar features and various compiler optimizations that confuse relationship between corresponding functions.

In some embodiments, even though both the inlining predictor and matching weights are trained with GCC, comparable matching results can be achieved on completely different compilers, such as on the Intel™'s ICC compiler. While compiler implementation may vary wildly, the types of optimizations they make can be similar "textbook" type optimizations.

To further understand how the code auditor achieves robust matching across compilers, consider the performance of the inlining predictor as an example. A 5-fold cross evaluation can be implemented across 10 applications. As an example, the predictor can be trained on the on GCC as described previously and then evaluated on the Intel™ ICC compiler. On average, the training set can include 12040 feature vectors and the testing set of 735 feature vectors. The cross-compiler performance of the inline predictor can enable the code auditor to achieve high percentage of accountability in some example embodiments, even across compilers.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

FIG. 7 is an example schematic of a system with the code auditor 10 on a mobile device 700 according to some embodiments. Mobile device 700 can install code auditor 10 to process applications with source code 14 and binary code 12 to detect malicious software. Code auditor 10 can process application at time of download or before execution, for example. Code auditor 10 can continuously monitor applications installed on mobile device 700 to detect malicious code.

The code auditor 10 can accept as input source code 14 and extract source code features including source code functions. The code auditor 10 can accept as input binary code and extract binary features, including binary functions.

The code auditor 10 can match the source code functions and the binary code functions by comparing a comparison selection of the source code features to a comparison selection of the binary code features.

The code auditor 10 can compare an accountability selection of features of the binary code features characterizing functions of the binary code functions with corresponding features of the source code features characterizing the corresponding functions of the source code functions to make a determination of the accountability of the binary code functions in terms of the source code functions.

The code auditor 10 can use machine learning for example, to extract features and find the optimal set of 1-1 feature pairs in the source code and binary code for the comparison selection. The code auditor can use machine learning to find which features pairs are more useful for matching. Key features can be parameters for the function call for graph edges and string literals, for example.

The code auditor 10 can output classifications 702 of safe functions 704 and suspicious functions 706 based on the accountability of the binary code functions in terms of the source code functions, for example. The mobile device 700 can use the classifications 702 for automatic decision making based on a security profile or policy. The security profile or policy may indicate one or more appropriate action items when malicious software is detected. For example, the mobile device 700 may uninstall or delete an application flagged with suspicious functions 706.

Figure 8:
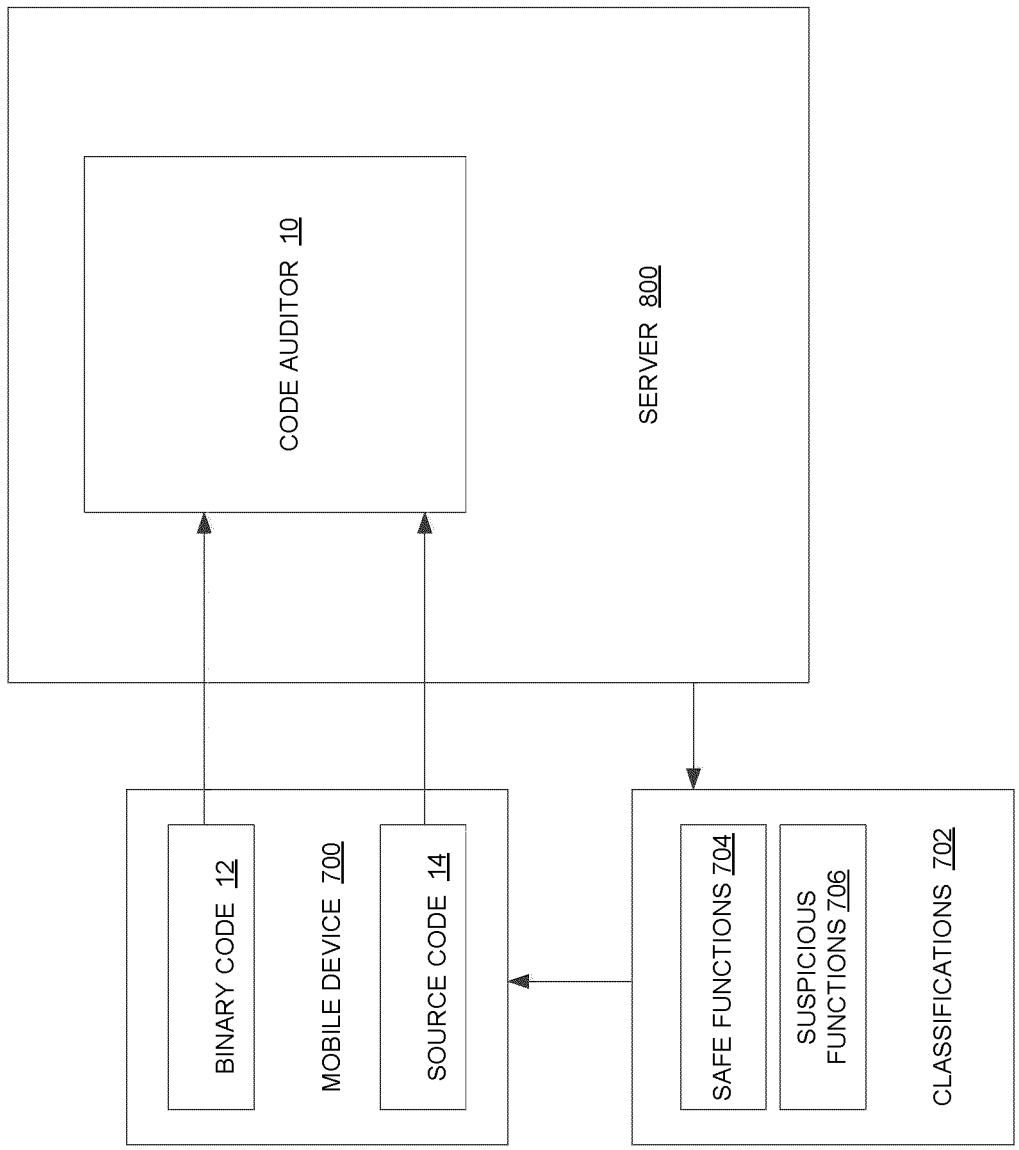
FIG. 8 is an example schematic of a system with the code auditor on a server connected a mobile device according to some embodiments.

FIG. 8 is an example schematic of a system with the code auditor 10 on server 800 connected a mobile device 700 according to some embodiments. In this example, mobile device 700 can send source code 14 and binary code 12 to server 800 with code auditor 10 for processing in order to detect malicious software. Code auditor 10 can generate the file of classifications 702 for transmission by server 800 to mobile device 700. Mobile device 700 uses the classifications 702 to implement appropriate action items when malicious code is detected.

The server 800 connects to other components in various ways including directly coupled and indirectly coupled via the network. Network (or multiple networks) is capable of carrying data and can involve wired connections, wireless connections, or a combination thereof. Network may involve different network communication technologies, standards and protocols.

Figure 9:
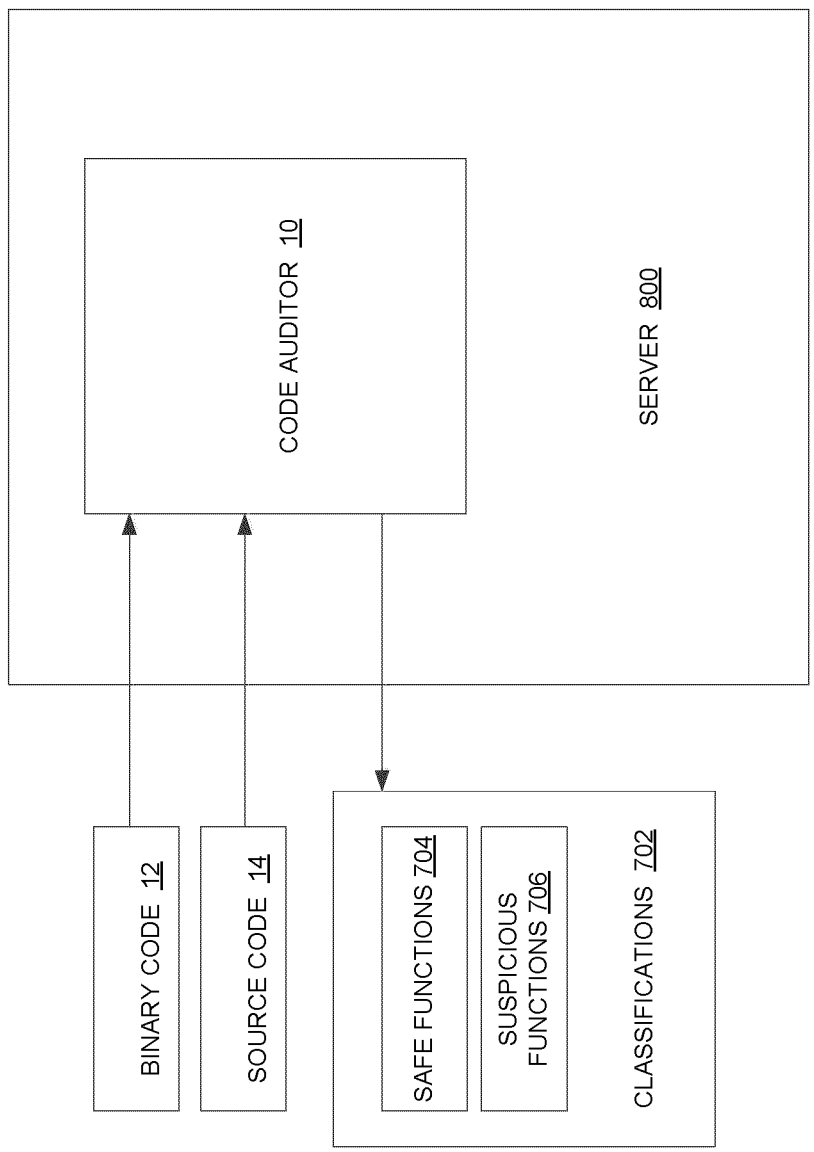
FIG. 9 is an example schematic of a system with the code auditor on a server according to some embodiments.

FIG. 9 is an example schematic of a system with the code auditor 10 on a server 800 according to some embodiments. The server 800 can provide Software as a Service or cloud service to process binary code 12 and source code 14 and output classifications 702. For example, a user device can connect to server 800 to transmit binary code 12 and source code 14 for processing. In response, the user device receives the classifications 702 to implement appropriate action items when malicious code is detected.

Mobile device 700 or server 800 includes at least one processor, memory, at least one I/O interface, and at least one network interface.

The processor may be, for example, any type of general-purpose microprocessor or microcontroller, a digital signal processing (DSP) processor, an integrated circuit, a field programmable gate array (FPGA), a reconfigurable processor, or any combination thereof.

Memory may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

The I/O interface enables mobile device 700 or server 800 to interconnect with one or more input devices, such as a keyboard, mouse, camera, touch screen and a microphone, or with one or more output devices such as a display screen and a speaker.

Each network interface enables mobile device 700 or server 800 to communicate with other components, to exchange data with other components, to access and connect to network resources, to serve applications, and perform other computing applications by connecting to a network (or multiple networks) capable of carrying data.

Mobile device 700 or server 800 is operable to register and authenticate users (using a login, unique identifier, and password for example) prior to providing access to code auditor 10.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may improve computing functionality by providing an innovative way to flag malicious software.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the features described above and illustrated are intended to be examples.

What is claimed is:

1. A non-transitory computer readable storage medium having stored therein computer executable program code, which when executed by a processor, causes the processor to provide a code auditor to classify safe functions and suspicious functions in code, the code auditor comprising:
    an extractor configured to accept as input source code and extract source code features including source code functions, and to accept as input binary code and extract binary features, including binary functions;
    a matching block configured to obtain an estimated correspondence between the source code functions and the binary code functions by comparing a comparison selection of the source code features to a comparison selection of the binary code features;
    an accountability block configured to compare an accountability selection of features of the binary code features characterizing functions of the binary code functions with corresponding features of the source code features characterizing the corresponding functions of the source code functions to make a determination of the accountability of the binary code functions in terms of the source code functions; and
    the source code auditor configured to output a classification file of safe functions and suspicious functions based on the accountability of the binary code functions in terms of the source code functions;
    wherein the comparison selection, for each pair composed of a function of the source code functions and a function of the binary code functions, includes a computed value representing a measure of a difference between the comparison selection of the features characterizing the function of the pair from the source code functions and the comparison selection of the features characterizing the function of the pair from the binary code functions.

2. The computer readable storage medium of claim 1 wherein the code auditor is configured to use machine learning to extract the source code features and the binary features and obtain the correspondence by determining an optimal set of 1-1 feature pairs in the source code and binary code.

3. The computer readable storage medium of claim 1 wherein the comparison selection implements a matching process based on a bi-partite match.

4. The computer readable storage medium of claim 1 wherein the safe functions are present in the source code functions and the binary code functions, wherein the suspicious functions are not present in the source code functions but are present in the binary code functions.

5. The computer readable storage medium of claim 1 wherein the comparison selection of the binary code features is different from the accountability selection of the features of the binary code features characterizing the function.

6. The computer readable storage medium of claim 1 wherein the comparison selection of the second set of features is identical to the accountability selection of the features of the binary code features characterizing the function.

7. The computer readable storage medium of claim 1 wherein the accountability selection is more strict than the comparing in the comparison selection.

8. The computer readable storage medium of claim 1 wherein the comparison selection of the source code features and the comparison selection of the binary code features each comprise function call graphs.

9. The computer readable storage medium of claim 1 wherein the comparison selection between the source code functions and the binary code functions is carried out iteratively, and the correspondence obtained at each non-final iterative step are used in the comparison of features in a subsequent iteration.

10. The computer readable storage medium of claim 1 wherein the comparison selection involves refinement in which the estimated correspondence is refined by comparing the number of conditional branches of the first code body functions to the number of conditional branches of the second code body functions.

11. The computer readable storage medium of claim 1 wherein the accountability selection includes string constants.

12. The computer readable storage medium of claim 1 wherein the accountability selection includes integer constants.

13. The computer readable storage medium of claim 1 wherein differences in integer constants less than a threshold are treated as the same.

14. The computer readable storage medium of claim 1 wherein the binary code is a transformation of the source code, wherein the source code and the object code each have a call graph.

15. The computer readable storage medium of claim 1 wherein the accountability selection includes callees.

16. The computer readable storage medium of claim 1 wherein the accountability selection includes library calls.

17. The computer readable storage medium of claim 1 wherein the estimation of the correspondence is carried out based on minimizing the computed values for pairs whose members are estimated to correspond.

18. The computer readable storage medium of claim 17 wherein minimizing the computed values for pairs whose members are estimated to correspond comprises assigning the computed values as edge weights on a bipartite graph.

19. A system for identifying suspicious features in code comprising:
    one or more hardware processors; and
    a memory coupled to the one or more hardware processors, the memory comprising:
        extractive logic that, when executed by the one or more hardware processors, receives as input source code and binary code, and extracts a first set of code features and a second set of code features, including a first set of functions and a second set of functions,
        matching logic that, when executed by the one or more hardware processors, estimates a correspondence between the first set of functions and the second set of functions by comparing a comparison selection of the first set of features to a comparison selection of the second set of features, and
        accountability logic that, when executed by the one or more hardware processors, compares an accountability selection of features of the second set of features characterizing functions of the second set of functions with corresponding features of the first set of features characterizing the corresponding functions of the first set of functions to make a determination of the accountability of functions of the second set of functions in terms of the first set of functions;
    wherein the comparison selection, for each pair composed of a function of the source code functions and a function of the binary code functions, includes a computed value representing a measure of a difference between the comparison selection of the features characterizing the function of the pair from the source code functions and the comparison selection of the features characterizing the function of the pair from the binary code functions.

20. A computer program product for identifying suspicious features in binary code, comprising:
    a non-transitory computer recordable storage medium having stored therein computer executable program code, which when executed by a computer hardware system, causes the computer hardware system to perform:
        extracting, using a first extractor, source code features from the source code, the source code features including source code functions extracted from the source code and source code features characterizing the source code functions;
        extracting, using a second extractor, binary code features from the binary code, the binary code features including binary code functions extracted from the binary code and binary code features characterizing the binary code functions;
        obtaining, in a matching block, a correspondence between the source code functions and the binary code functions by comparing a comparison selection of the binary code features characterizing the binary code functions to a comparison selection of the source code features characterizing the source code functions; and
        classifying, in an accountability blocks, functions in the binary code functions into either a first category or a second category according to a comparison of an accountability selection of the binary code features characterizing the binary code functions with corresponding source code features characterizing the respective source code functions estimated to correspond to the binary code functions;
    wherein the comparison selection, for each pair composed of a function of the source code functions and a function of the binary code functions, includes a computed value representing a measure of a difference between the comparison selection of the features characterizing the function of the pair from the source code functions and the comparison selection of the features characterizing the function of the pair from the binary code functions.

* * * * *